Figure 2:
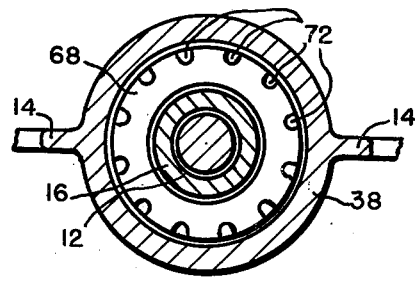

Aug. 27, 1940.                H. McCARTHY ET AL                2,212,572
                                    VALVE
                             Filed Aug. 25, 1937

INVENTOR.S
Harry McCarthy &
James J. Curran
BY
Albert J. Henderson
ATTORNEY.

Patented Aug. 27, 1940

2,212,572

UNITED STATES PATENT OFFICE 2,212,572

VALVE

Harry McCarthy, Kewanee, Ill., and James J. Curran, Greensburg, Pa., assignors to Walworth Patents Inc., Boston, Mass., a corporation of Massachusetts Application August 25, 1937, Serial No. 160,752

10 Claims. (Cl. 74—424.8)

This invention relates to valves and more particularly to the actuating means therefor.

Although the invention is primarily adapted for use with gate valves, wherein reciprocation of a threaded stem in a yoke nut or sleeve actuates the closure or gate, and is so illustrated and described herein, it will be understood that this specific use is intended by way of example only and the invention is not so restricted. Moreover, it will be apparent that the device may be used in connection with power operated valves as well as those of the manually operated type described and shown.

Valves of the type described are often used for controlling the flow of high temperature fluids under pressure. In such cases the fluid will transmit considerable heat to the valve parts. When the valve is open and the fluid is flowing through the valve body passageway, the body and adjacent parts soon become heated while the parts more remote from the fluid passageway, such as the stem and yoke sleeve, remain comparatively cool. Now, if the valve is suddenly closed, the stem becomes heated and expands. The gate or closure is jammed on its seat and, being unable to move further in this direction, the expanding stem places an enormous strain upon the yoke sleeve at the other end. The sleeve may be torn from its position and, being unable to perform its function of holding the gate on its seat, will be forced out of the valve by the fluid pressure, carrying the handwheel and stem with it. The danger to the operator and others from such an occurrence will readily be apparent.

Failure of the yoke sleeve may also result from contraction of the stem when the valve is in full open position. Usually a backseating arrangement is incorporated in the valve and no provision is made for further movement of the closure or sleeve when this device is functioning. If contraction occurs and the sleeve fails, the closure would drop onto the seat with resulting damage from the sudden closing of the valve.

In addition to the causes outlined above, a similar failure of the yoke sleeve may occur when too great a force is used to wedge the closure member in its seat. This may occur from negligent handling in the case of manually operated valves, or from a defective clutch or switch mechanism in power operated valves. Here no question of high temperatures causing stem expansion or contraction may be involved, but an excessive load may be placed on the yoke sleeve causing failure. In any of the described events the operator is endangered and other serious results may follow from the incapacity of the valve.

It is an object of this invention to eliminate the failure of valve parts from the causes outlined and others.

Another object of the invention is to permit substantial expansion or contraction of the valve stem without injury to the valve.

Another object of the invention is to eliminate structural damage due to the use of excessive foce in closing or opening the valve.

Another object of the invention is to insure that the valve will remain in open or closed position until otherwise desired.

Another object of the invention is to preserve the ease of operation of a valve while rendering it free from the hazards described.

Another object of the invention is to permit its application to either manually or power operated valves.

Another object of the invention is to accomplish the improvements without departing radically from standard practice in the design of valves or adding materially to the cost of manufacturing.

Figure 1:
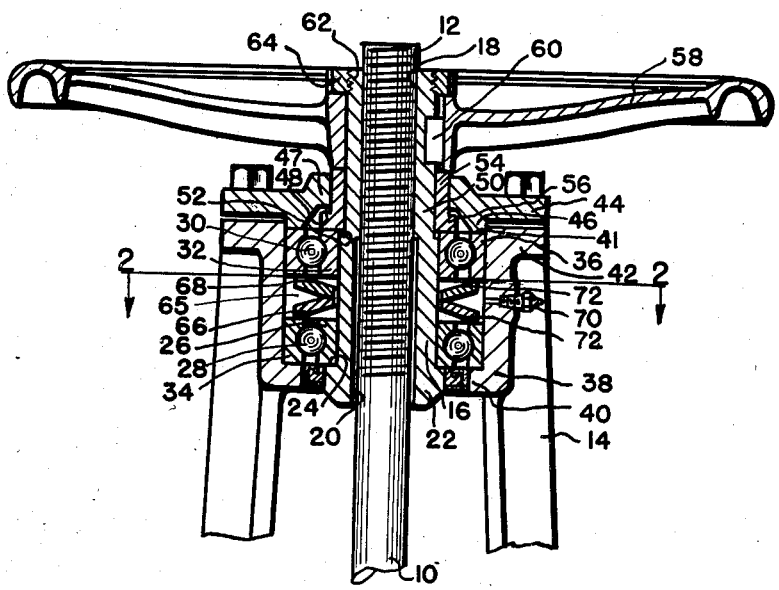

Other objects and advantages will become apparent from the following description taken in connection with the accompanying drawing wherein:

Fig. 1 is a fragmentary elevational view, partly in section, of a valve actuating means embodying the invention, and Fig. 2 is a section taken on the line 2—2 of Fig. 1 looking in the direction indicated by the arrows.

Referring more particularly to the drawing, the valve stem 10 which is of the rising type is provided with a threaded end 12 projecting through the yoke member 14 of the valve. A yoke sleeve 16 is provided with an internal threaded portion 18 at one end engaging the threaded valve stem 12 and with a thread clearance bore 20 at the other end. The yoke sleeve 16 is further provided with an enlarged head 22 defining a shoulder 24 upon which the inner ring 26 of an anti-friction bearing 28 is seated. A second anti-friction bearing 30 has an inner ring 32 engaging the sleeve 16, but being spaced from the bearing 28 substantially midway between the ends of the sleeve 16. The outer rings, 34 and 36 respectively, of the bearings 28 and 30 are housed within an annular portion 38 of the yoke 14, preferably formed integral therewith. The annular portion 38 may be provided with an introverted flange 40 upon which the outer ring 34 may be seated.

Preferably, the annular portion 38 extends from the flange 40 beyond the end face 41 of the bearing 30 and terminates in a rim or flange 42 at the top of the yoke 14. Secured to the flange 42 is an annular cover member 44, having on its underside an annular depending portion 46 extending within the annular portion 38 of the yoke 14 and engaging the end face 41 of the outer ring 36 of the bearing 30. The annular portion 46 of the cover 44 adjacent its inner periphery, is preferably raised, as at 47, to provide a clearance space between the underside thereof and the end face 41 of the inner ring portion 32 of the bearing 30. An abutment surface 48 may be formed on the underside of the raised portion 47.

The yoke sleeve 16 is further provided with a reduced portion 50, extending from the end opposite the head 22 to a point intermediate its ends, and defining an abutment surface 52 lying within the end face 41 of the bearing 30. A bushing 54 surrounds the reduced portion 50 on the sleeve 16 and is provided with a head 56 seated upon the end face 41 of the inner ring portion of bearing 30. The head 56 thus occupies the space between the abutment surface 48 of the cover and the end face 41 of the inner ring portion 32 of bearing 30. The head 56 of the bushing, when seated as described, is slightly spaced from both the abutment surfaces 48 and 52 as shown in Fig. 1. Surmounting the bushing 54 is the usual handwheel 58, secured to the sleeve 16 against rotation thereon, as by means of the key 60. The end 62 of the sleeve 16, beyond the handwheel 58, may be threaded for the reception of a lock nut 64 for holding the parts together.

This invention is particularly directed to providing a means for permitting substantial expansion or contraction of the valve stem without injury to the valve, and also for preventing damage to the yoke sleeve should the valve closure be wedged with too great a force upon its seat. To this end, provision is made for permitting an axial movement of the yoke sleeve either toward or away from the valve passageway at any time that a predetermined load limit upon the yoke sleeve is exceeded. This may be accomplished by incorporating a yieldable element in the valve actuating means, which ordinarily will remain inactive, but which is adapted to permit axial movement of the sleeve under the stated conditions.

In this embodiment the yieldable means, denoted generally by reference numeral 65, takes the form of a pair of dished annular members 66 and 68 which are interposed between the bearings 28 and 30 in the annular portion 38 of the yoke 14 and loosely fitting the sleeve 16. The dished annular members 66 and 68 are placed with their convex surfaces face to face so that the meeting edges are adjacent the sleeve 16 and the spaced edges adjacent the wall of the annular portion 38 and engaging the outer rings 34 and 36 of the bearings 28 and 30 respectively. These annular members are preferably made of metal suitably treated to produce good spring properties therein, that is, with a sufficiently high elastic limit so that ordinary service will not cause permanent set. Provision may be made for lubricating the bearings and, in this instance, a lubricant connection 70 is secured to the annular portion 38 of the yoke 14 communicating with the space between the bearings 28 and 30 occupied by the annular members 66 and 68. In order that lubricant may reach the bearings beyond the line of contact of the annular members therewith, the outer edges of the annular members 66 and 68 engaging the bearings may be provided with a plurality of grooves or notches 72 for this purpose.

When the parts are assembled as shown in Fig. 1, the lock nut 64 engages the handwheel 58 and holds the enlarged head 22 of the sleeve 16 in engagement with the inner ring 26 of bearing 28. The bushing 54 is retained in engagement with the inner ring 32 of bearing 30 and the thrust thereof is transmitted from the inner ring 32 of bearing 30 through the outer ring 36 to the annular members 68 and 66 from whence it is transmitted to the outer ring 34 of bearing 28 through the bearing to the inner ring 26 thereof engaging the enlarged head 22. When the valve is being closed it is necessary to apply a certain load on the stem to insure that the closure is seated properly. As this load remains practically constant it is feasible to compress the yieldable element 65 a definite amount to cause an initial deflection of the annular members 66 and 68. After this initial deflection is given to the annular members, no further deflection need occur due to the normal seating pressure on the valve stem. Consequently, when the parts are assembled as described it is preferable that the yieldable element 65 be placed under sufficient compression to restrain the sleeve 16 against any axial movement within the load limit necessary to seat the closure properly. In effect, during normal operation of the valve, the actuating means is as equally non-yielding as any valve actuating means having no yieldable element.

Assuming that the valve is conveying high temperature fluid and the closure is moved into its seat while the valve stem 10 remains comparatively cool, an expansion of the valve stem will occur after the valve is fully seated. Such expansion of the valve stem will cause the sleeve 16 to move axially away from the closure and the fluid passageway causing deflection of the annular members 66 and 68. This axial movement of the yoke sleeve continues until the expansion of the stem, due to temperature change, ceases. The total upward movement of the yoke sleeve will not be sufficient to cause the abutment surface 52 thereon to engage the head 56 of the bushing 54 because ample latitude for movement of the sleeve is provided before this engagement occurs. However, if for any reason the yoke sleeve fails, as by shearing off of the enlargement 22, the abutment surface 52 will move the bushing 54 axially in the cover 44 until the head 56 engages the abutment surface 48 on the cover 44. Hence, the abutment surfaces 52 and 48 cooperate with the bushing 54 to limit the axial movement of the sleeve 16 upon failure thereof to perform its normal restraining function and to prevent it from being forced entirely out of the yoke.

It will be apparent that expansion of the stem when the valve is closed, compresses the yieldable element 65 to permit axial movement of the yoke sleeve without harmful results to any part of the valve structure. A similar action occurs when the valve is open and the stem contracts upon cooling. The yieldable element will deflect to permit axial movement of the yoke sleeve toward the closure or fluid passageway under these conditions. Moreover, should the closure member be wedged to its seat in closed position or withdrawn too forcibly against the usual backseating member in open position, the sleeve will again be permitted to move and relieve any stress which might otherwise cause damage.

It is necessary to insure that the movement of the valve stem due to temperature changes, or the other causes outlined, does not so increase the initial load on the yieldable element 65 as to cause a permanent set to occur in this element. This can readily be guarded against by making the annular members 66 and 68 capable of withstanding at maximum deflection a load well above that which would be due to temperature changes or other conditions imposing additional loads. Hence, all of the objects of the invention have been accomplished in the illustrative embodiment and the advantages will be readily apparent.

We claim:

1. Actuating means for valves and the like having a threaded stem, comprising a sleeve threadedly engaging said stem, means for rotating the sleeve on said stem, a stationary member extending around said sleeve, spaced bearing means mounting said sleeve for rotary movement in said stationary member, means effective within a predetermined load limit for retaining said sleeve against axial movement relative to said stationary member, said means including a spring element coacting with said bearing means for receiving axial thrust from said sleeve and being yieldable under a load beyond said limit to permit axial movement of said sleeve, and spaced abutment surfaces associated with said sleeve and stationary member and adapted to become operative after limited axial movement of said sleeve.

2. Actuating means for valves and the like having a threaded stem, comprising a sleeve threadedly engaging said stem, means for rotating said sleeve on said stem, a stationary member extending around said sleeve, bearing means carried by said stationary member and engaging said sleeve, an enlargement at one end of the sleeve beyond said bearing means, adjustable means at the opposite end of the sleeve holding said enlargement in engagement with the bearing, a spring element within the stationary member tending to restrain said sleeve against axial movement therein but being yieldable beyond a predetermined load limit, and spaced abutment surfaces associated with said sleeve and stationary member adapted to become operative after limited axial movement of said sleeve.

3. Actuating means for valves and the like having a threaded stem, comprising a sleeve threadedly engaging said stem, means for rotating said sleeve on said stem, a stationary member extending around said sleeve, bearing means carried by said stationary member and engaging said sleeve, an enlargement at one end of the sleeve beyond said bearing means, adjustable means at the opposite end of the sleeve holding said enlargement in engagement with the bearing, a spring element within the stationary member tending to restrain said sleeve against axial movement therein but being yieldable beyond a predetermined load limit, opposed abutment surfaces on said sleeve and stationary member spaced one from the other, and a bushing having abutment surfaces interposed between the other said surfaces and normally spaced therefrom but being adapted to abut thereon after limited axial movement of said sleeve.

4. Actuating means for valves and the like having a threaded stem, comprising a sleeve threadedly engaging said stem, means for rotating said sleeve on said stem, a stationary member extending around said sleeve, a pair of spaced bearings carried by said stationary member and engaging said sleeve, an enlargement at one end of the sleeve beyond the bearings, adjustable means at the opposite end of the sleeve holding said enlargement in engagement with one of said bearings, a spring element interposed between said bearings and tending to restrain said sleeve against axial movement in said stationary member, said spring being yieldable beyond a predetermined load limit, opposed abutment surfaces on said sleeve and stationary member spaced one from the other, and a bushing having abutment surfaces interposed between the other said surfaces and normally spaced therefrom but being adapted to abut thereon after limited axial movement of said sleeve.

5. Actuating means for valves and the like having a threaded stem, comprising a sleeve threadedly engaging said stem, means for rotating said sleeve on said stem, a stationary member extending around said sleeve, a pair of spaced bearings carried by said stationary member and engaging said sleeve, an enlargement at one end of the sleeve beyond the bearings, adjustable means at the opposite end of the sleeve holding said enlargement in engagement with one of said bearings, a pair of dished annular members interposed between said bearings having meeting edges adjacent said sleeve and spaced edges engaging said bearings, said members forming a spring element tending to restrain said sleeve against axial movement in said stationary member but being yieldable beyond a predetermined load limit, opposed abutment surfaces on said sleeve and stationary member spaced one from the other, and a bushing having abutment surfaces interposed between the other said surfaces and normally spaced therefrom but being adapted to abut thereon after limited axial movement of said sleeve.

6. Actuating means for valves and the like having a threaded stem, comprising a sleeve threadedly engaging said stem, means for rotating said sleeve on said stem, a stationary member having an annular portion extending around but spaced from said sleeve, an introverted flange at one end of said annular portion, a cover member carried by the opposite end of said annular portion, a pair of spaced bearings for said sleeve housed within the annular portion, one of said bearings being seated partly upon said flange and the other said bearing being engaged by said cover, an enlargement at the end of the sleeve adjacent said flange and adapted for seating the other part of said bearing, adjustable means for retaining said enlargement in engagement with the said bearing, a pair of dished annular members interposed between said bearings having meeting edges adjacent said sleeve and spaced edges engaging said bearings, said members forming a spring element tending to restrain said sleeve against axial movement in said stationary member but being yieldable beyond a predetermined load limit, opposed abutment surfaces on said sleeve and cover member spaced one from the other, a bushing interposed between the cover member and sleeve, and a head on said bushing normally spaced from said cover and seated upon the bearing engaged thereby, said head being engageable by the abutment surface on said sleeve and movable therewith into abutting relation with said cover after limited axial movement of said sleeve.

7. Actuating means for valves and the like having a threaded stem, comprising a sleeve threadedly engaging said stem, means for imparting relative rotation to the sleeve and stem, a housing for said sleeve, a pair of spaced bearing means carried by said housing and engaging said sleeve, adjustable means for restraining said sleeve against axial movement relative to said housing, and a spring element interposed between said bearings and yieldable beyond a predetermined load limit to permit axial movement of said sleeve in either direction.

8. Actuating means for valves and the like having a threaded stem, comprising a sleeve threadedly engaging said stem, means for imparting relative rotation to the sleeve and stem, a housing for said sleeve, a pair of spaced bearing means carried by said housing and engaging said sleeve, an enlargement at one end of the sleeve beyond said bearing means, adjustable means at the opposite end of the sleeve holding said enlargement in engagement with the bearing and restraining said sleeve against axial movement relative to said housing, and a pair of dished annular members interposed between said bearings forming a spring element yieldable beyond a predetermined load limit to permit axial movement of said sleeve in either direction.

9. Actuating means for valves and the like having a threaded stem and a stationary housing surrounding said stem, a sleeve extending within said housing and threadedly engaging said stem, said sleeve being spaced from said housing to form a chamber therebetween, means for rotating said sleeve on said stem, an annular member carried by said sleeve extending within said chamber and having limited axial movement with said sleeve relative to said housing, spaced bearing means in said chamber for supporting said sleeve within said housing, and a spring element in said chamber coacting with said bearing means and annular member for receiving axial thrust from said sleeve and being yieldable thereunder to permit said limited axial movement.

10. Actuating means for valves and the like having a threaded stem and a stationary housing surrounding said stem, a sleeve extending within said housing and threadedly engaging said stem, means for rotating said sleeve on said stem, an annular member interposed between and coaxial with said sleeve and housing, a flange extending laterally from said member and having limited axial movement therewith and with said sleeve relative to said housing, spaced anti-friction bearings mounting said sleeve for rotary movement in said housing, and a spring element coacting with said bearings and flange for receiving axial thrust from said sleeve and being yieldable thereunder to permit said limited axial movement.

HARRY McCARTHY.
JAMES J. CURRAN.